UNITED STATES PATENT OFFICE.

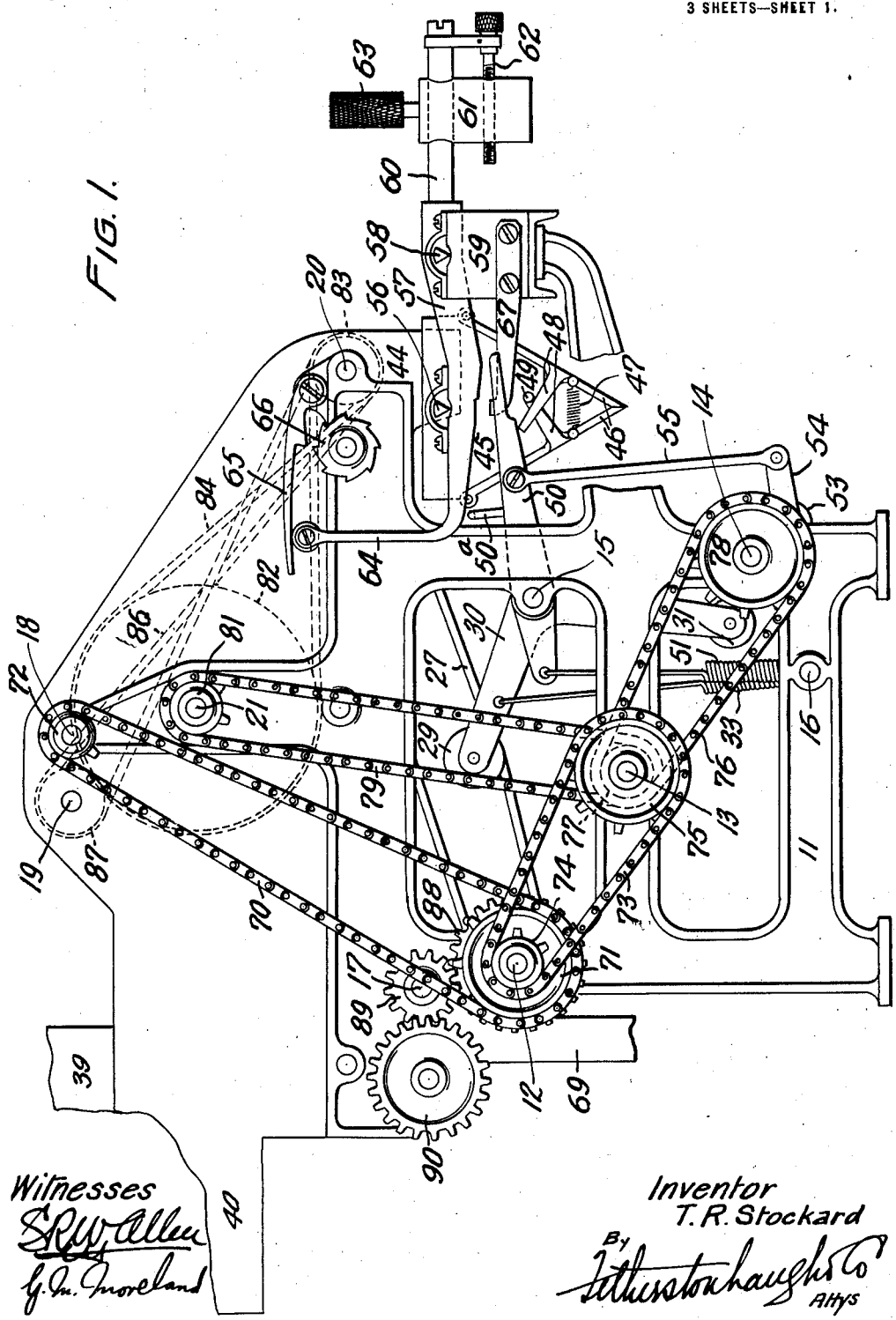

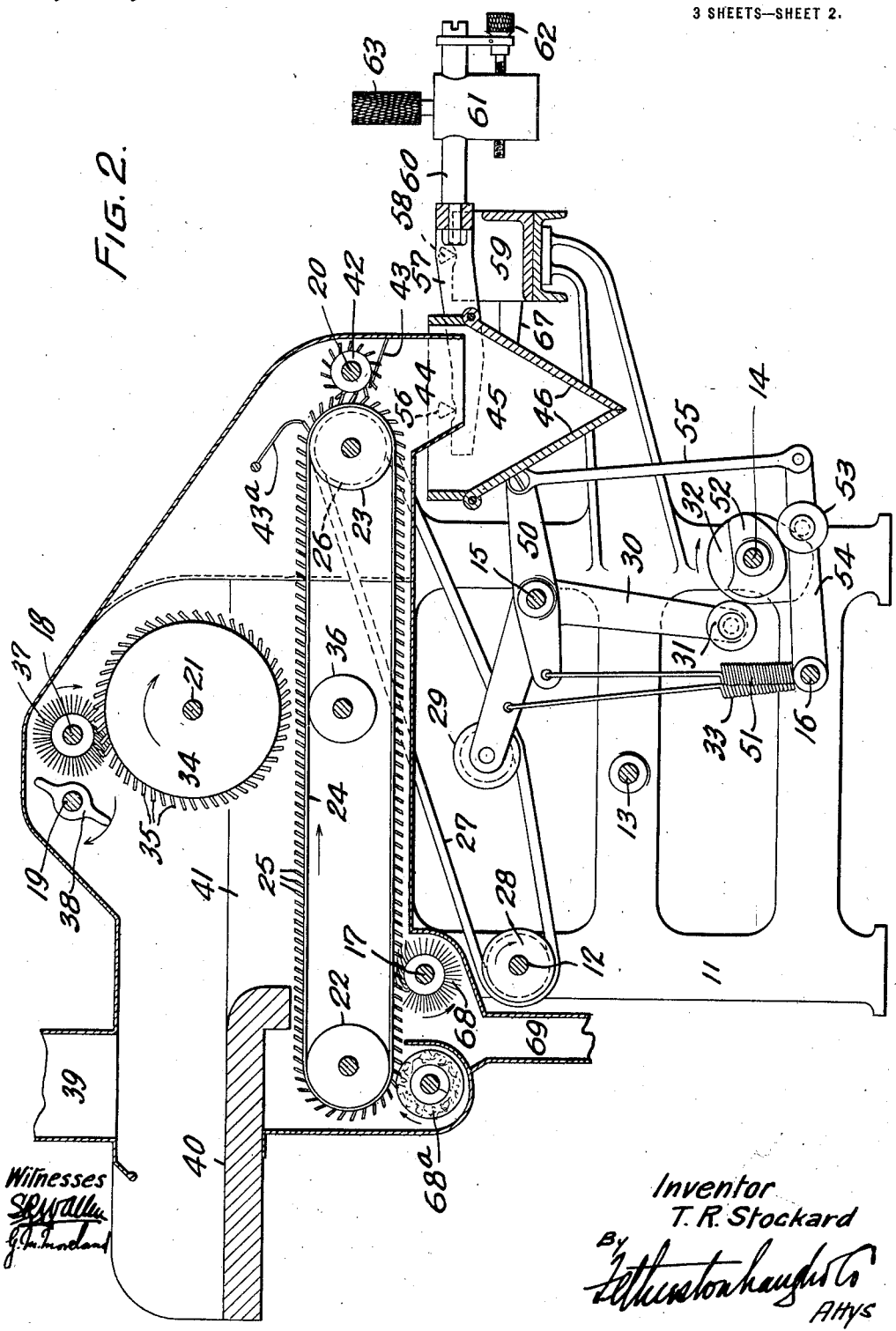

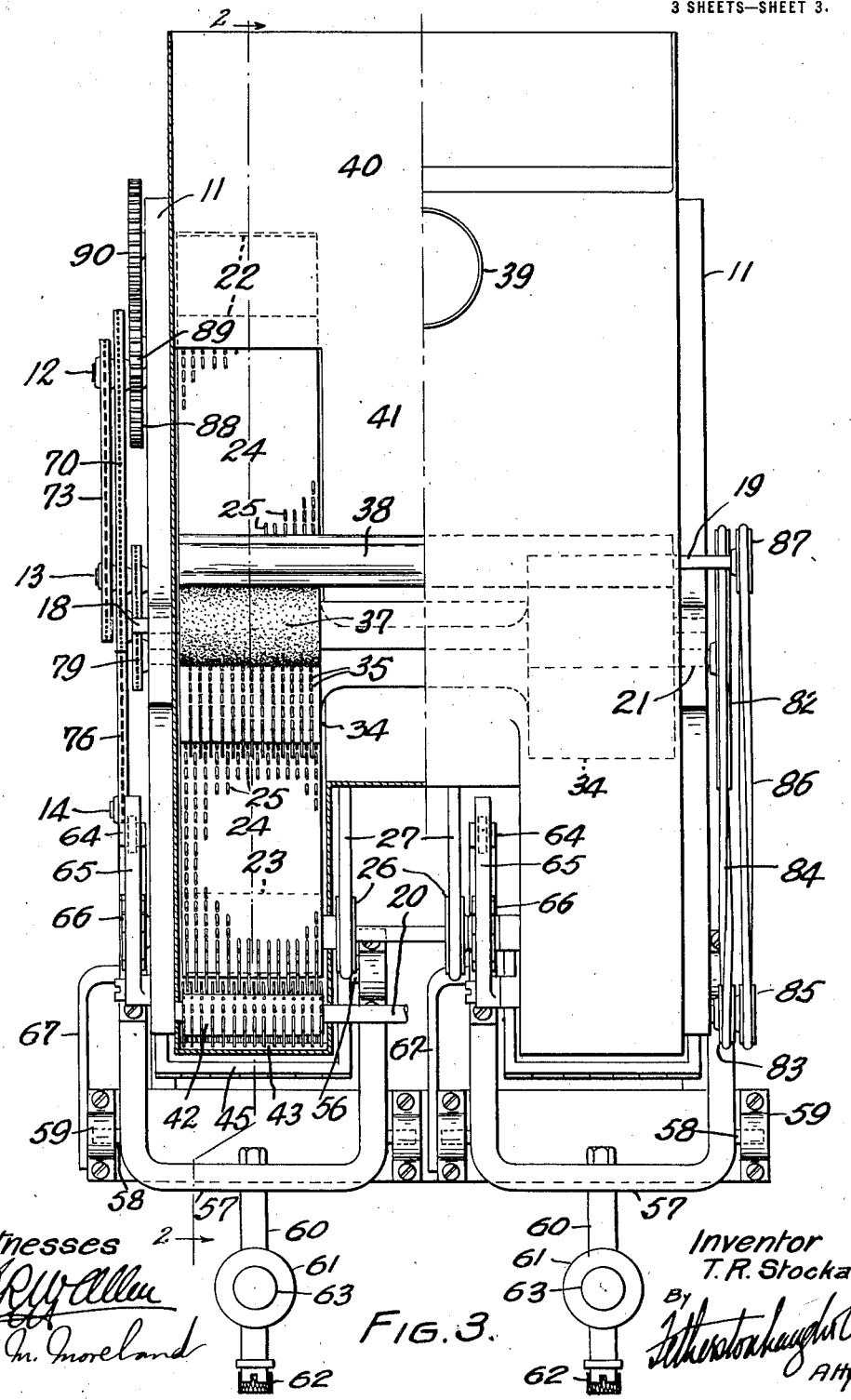

THOMAS R. STOCKARD, OF MONTREAL, QUEBEC, CANADA.

TOBACCO-WEIGHING MACHINE.

1,247,736.

Specification of Letters Patent. Patented Nov. 27, 1917.

Application filed March 23, 1916. Serial No. 86,124.

*To all whom it may concern:*

Be it known that I, THOMAS R. STOCKARD, a citizen of the United States, and resident of the city of Montreal, in the Province of Quebec and Dominion of Canada, have invented certain new and useful Improvements in Tobacco-Weighing Machines, of which the following is a full, clear, and exact description.
This invention relates to improvements in tobacco weighing machines, and the object of the invention is to provide an efficient and durable machine of large capacity particularly adapted to the weighing of tobacco in cut plug or other shredded form.

Weighing machines have been produced in the past which work admirably with flake or granular tobacco, as this material flows quite readily. Until the present time, however, there has been no machine which will satisfactorily weigh cut plug tobacco, that is, tobacco which is in long shreds. The tendency of these shreds to cling together, especially when the tobacco is in the moist condition in which it is handled when in the factory, is so great that the tobacco will frequently hang in masses as big as a large pail from the open end of a vertically disposed chute. Recourse has, therefore, been had to hand weighing, and even with this, difficulty is experienced from the tendency of the tobacco to cling together in large masses. The result is that at any efficient speed of operation, the weighers frequently deliver to the packing machines much more or much less than the desired weight of tobacco. This results in a very considerable loss, as it has been found that packages of a designated weight as a rule contain more than the indicated weight. As this percentage of over-weight varies, it is clear that considerable loss may result to the manufacturer. It will therefore be obvious that a machine which will perform accurately the weighing usually done by a number of persons will effect a great saving, even if the speed of weighing is not any greater than can be performed by hand. If the speed of weighing can be increased, the saving clearly increases correspondingly.

The machine hereafter described has been produced and upon test has been found to quickly and accurately weigh cut plug tobacco in practically any condition, each unit of the machine having a capacity approximately equal to or greater than an operator weighing by hand. Thus, one machine of comparatively small size will give the same output as a large number of operators, resulting in an economy of space and a saving in labor cost, in addition to the saving effected by accurate weighing. The machine consists briefly of a number of scale pans somewhat similar in construction to the grab buckets commonly used in excavating machinery. Each scale pan is supplied with tobacco by an endless conveyer belt upon which the tobacco is arranged in a layer of uniform thickness by a series of rolls, and from which the tobacco is swept into the scale pans by revolving combs. In order to stop the supply of tobacco when the pan receives a sufficient amount, a stop is provided for the conveyer belt, which is thrown into operation by the scale pan as it commences to drop. Mechanically operated means are provided for periodically opening the scale pans, so that the tobacco falls into chutes leading to the packing machines. Means is provided for stopping the drive of the conveyers periodically. The remaining elements of the machine are chiefly means for cleaning the conveyer belts and distributing rolls.

In the drawings which illustrate the invention:—

Figure 1 is a side elevation of the machine.

Fig. 2 is a vertical section on the line 2—2, Fig. 3.

Fig. 3 is a plan view of a machine composed of two units, parts being broken away in section.

As has been stated in the short description of Fig. 3, the machine illustrated is composed of only two units, but in practice, a machine will rarely comprise less than six units. If the capacity of the packing machine warrants, the weighing machine may be composed of as many more units as desired, or a single weighing machine may be arranged to supply two or more packing machines.

Referring more particularly to the drawings, 11 designates a framework of any suitable size and design, in which is mounted a drive shaft 12, counter shaft 13, a cam shaft 14, and a pair of cam lever shafts 15 and 16, also brush shafts 17 and 18, a beater shaft 19, a comb shaft 20, and a tumbling roll shaft 21. These shafts are common to all units of the machine. In each unit, a pair of pulleys 22 and 23 are mounted one at the front and one at the rear end of the machine and carry between them an endless belt 24 having teeth 25 thereon. These teeth are of suitable strength and length, and may be arranged in any desired manner such as that well known in the manufacture of card clothing. The teeth are inclined in the direction of belt travel. The pulley 23 carries fixed thereto a pulley 26, which is driven by a slack belt 27 from a pulley 28, mounted on the drive shaft 12. In order to take up the slack of the belt sufficiently to insure against slip in driving the conveyer, a roller 29 is provided floating on the belt. This roller is carried by one arm of a bell crank lever 30, pivoted on the shaft 15, and provided at its opposite end with a roller 31 bearing against a cam 32 on the shaft 14. A spring 33 is provided to normally hold the roller 29 down, and the roller 31 against the cam. When the high part of the cam runs under the roller 31, the lever 30 is shifted to release the roller 29, thus loosening the belt, so that the same will slip on its pulleys without friction and without undue polishing of the belt. It will be understood that there is a separate driving belt together with its tightener for each unit of the weighing machine.

A roll 34 is mounted above each conveyer 24, and is driven at low speed in the same direction as the conveyer, so that the lower portion of the roll adjacent the upper portion of the conveyer travels in the opposite direction. This roll is provided with teeth 35 inclined in the direction of its revolution. Under the roll 34, the conveyer is supported by an idler roll 36. Above the roll 34, a high speed brush 37 is mounted, which operates to clean off any shreds of tobacco adhering to the roll, and throw the same back among the tobacco to be passed through the machine. To prevent this brush becoming clogged, a rapidly revolving beater 38 is provided therefor.

The tobacco falls through a chute 39 on to a table 40, from which it is distributed between guides 41 to the conveyers of the various units. The tobacco tends to remain in comparatively large masses, and it is this fact which has hitherto prevented the practical machine weighing of cut plug tobacco. The oppositely traveling adjacent surfaces of the conveyer and roll 34, with their oppositely directed teeth operate to tear these masses of tobacco apart, the roll having a tendency to tumble the tobacco, while its teeth tear off the shreds from the outside of the mass. Simultaneously, the teeth of the conveyer tear off shreds from the outside or catch those loosened by the roll, and carry them along under the roll, which is set down sufficiently so that its teeth just clear the teeth of the conveyer. In this way, the roll permits the conveyer to remove a layer of tobacco equal in thickness to the length of its teeth, while any superfluous tobacco, such as small masses riding on top of this layer, are raked off by the roll. After passing under the roll 34, the tobacco is carried to the forward end of the conveyer, where it is removed from the teeth of the conveyer by the revolving comb 42. The teeth of this comb are inclined oppositely to the direction of the comb's revolution, so that there is no tendency for the tobacco to gather at the roots of the teeth. Any tendency of the tobacco to adhere to the revolving comb is overcome by the provision of a stationary comb 43 through the teeth of which the revolving comb teeth pass. The tobacco is thus freed and drops in a fine stream at very uniform rate through a chute 44 into a scale pan 45. Any tendency of the tobacco to fall from the conveyer after the same stops is overcome by the gate 43ª.

The scale pan is provided with bottom doors 46, which are normally held closed by springs 47. The doors are each provided with a lever 48, one of which has a pin 49 overlying the other lever and projecting a suitable distance therebeyond, so as to come in the path of an arm 50 pivotally mounted intermediate its ends on the shaft 15. The end of this arm remote from the scale pan is connected by a spring 51 with the shaft 16, the spring operating to normally maintain the arm out of engagement with the pin 49. The arm is operated at stated intervals by a cam 52 mounted on the shaft 14 and engaging a roller 53 mounted on a lever 54, one end of which is pivoted on the shaft 16 and the opposite end of which is connected by a link 55 with the arm 50 on the side of its pivotal shaft adjacent the scale pan. The scale pan is mounted by means of knife edge bearings 56 in a fork 57, which is in turn mounted by means of knife edge pivots 58 in stationary bearings 59 carried by a suitable extension of the framework. An arm 60 is attached to the fork on the opposite side of the pivot 58 from the scale pan, and carries the slidable counterbalance weights 61, which may be adjusted to regulate the amount of tobacco, which will tip the scale by means of the screw 62, and then locked by the set screw 63.

One arm of the fork 57 is extended upwardly, as at 64, and engages under and supports a pawl 65 mounted in any suitable part of the frame and adapted when it drops to engage the teeth of a ratchet wheel 66, rigidly mounted with respect to the pulleys 23 and 26.

When sufficient tobacco accumulates in the pan 45 to overbalance the counter weight 61, the pan drops until one arm of the fork 57 engages a fixed stop 67. This checks downward movement of the pan. The tilting of the fork removes the support of the pawl 65 which falls into engagement with the ratchet wheel 66, and locks the ratchet wheel, and therefore locks the conveyer pulley 23 and belt pulley 26 against rotation. The belt 27 being quite slack will slip on the pulleys 26 or 28, when the pulley 26 is locked against revolution. The speed of the machine is so adjusted that the cam shaft 14 makes only one revolution for each tilting of the bucket, so that it is clear there will be very little slip in the belt. Very shortly after the pan drops, the cam 32 operates the lever 30 and raises the pulley 29 against the spring 33, thus further slacking the belt and avoiding undue friction and belt polishing. It will be readily seen that the dropping of the scale pan stops the conveyer. Therefore, no further tobacco falls into the pan. As the revolution of the cam shaft 14 continues, the cam 52 operates the lever 50 through the medium of the lever 54 and link 55 depressing the same, so that the end of this lever engages and presses down the pin 49. The result is that both levers 48 are depressed and have the effect of swinging the doors 46 open against the action of the closure spring 47. The pan thus opened allows the tobacco therein to fall through any suitable chute, (not shown) to the packing machine. When the cam 52 completes its passage under the roller 53, the spring 51 returns the parts to normal, so that the spring 47 closes the scale pan, and the lightened pan may be raised by the counter weight 61 or by the lever 50. The cam 52 is so formed that when the pan is emptied, the lever 50 rises quickly and a pin 50ª thereon drives the fork 57 up so that the pawl 65 is knocked up out of engagement with the ratchet wheel 66, and the fork held a sufficient length of time for the pan to steady itself. The cam thus permits the lever 50 to lower slowly to normal position clear of the fork, so that the scale is free to tilt when it receives the proper weight of tobacco. Simultaneously with the knocking up of the pawl, the cam 32 completes its passage under the roller 31, so that the lever 30 is released and drawn down by its spring 33 to tighten the conveyer driving belt 37 and start the conveyer in operation.

A small high speed brush 68 is mounted under the rear end of the conveyer to remove any small fragments of tobacco or dust which may be adhering to the conveyer belt or pins. These fragments, which are practically waste, pass down through a chute 69, and may be dealt with in any suitable manner. Immediately behind the brush, a felt roller 68ª is mounted, traveling slightly faster than the belt and at the same direction at contacting points. This roller is preferably dampened and operates to wash the tops of the conveyer pins and clear away any accumulation of molasses, licorice, etc., so that the tobacco will not stick to the pins and resist removal by the revolving comb.

The drive of the various elements is as follows:—

A chain 70 extends from a gear 71 on the shaft 12 to a pinion 72 on the brush shaft 18. A chain 73 travels over a pinion 74 on the main shaft, and a gear 75 on the counter shaft 13, thus driving the counter shaft more slowly than the main shaft. A chain 76 connects a pinion 77 on the counter shaft with a gear 78 on the cam shaft 14, thus driving the cam shaft more slowly than the counter shaft. A chain 79 runs over a pinion 80 on the counter shaft and pinion 81 on the roll shaft 21. The roll shaft carries a large grooved belt pulley 82, which drives a small pulley 83 on the comb shaft 20 by means of a crossed belt 84. A second small pulley 85 on the comb shaft is connected by a crossed belt 86 with the drive pulley 87 of the beater shaft 19. A gear 88 on the main shaft 12 drives a pinion 89 on the brush shaft 17 at high speed, and the pinion in turn drives a large gear 90 connected with the felt roll, so that the roll operates only slightly faster than the conveyer belt and in the opposite direction to the brush. The drive of the conveyer belts have been already explained. It will be understood that there is a separate drive for the conveyer belt of each weighing unit, a separate drive belt regulating cam and a separate scale emptying cam for each unit. In the other parts of the device, the drive is common to all units, that is to say, all the combs 42 are operated continuously from the single shaft 20, also all the rolls 34, and similarly with the various brushes.

It is believed that from the foregoing description, the operation of the machine will be readily understood, so that only the briefest recapitulation is necessary. The entire success of the machine depends on the tearing apart of tobacco masses by the conveyer and roll 34, limiting the discharge of the machine from the belts to a substantially uniform amount per unit of time. Coupled with this is the feature of individual conveyers for each scale pan, which are automatically stopped by tipping of the scale pan, so that no tobacco in excess of the desired weight can be discharged into the pan. The arrangement and adjustment of the machine is such that when weighing to the maximum capacity of the pans, the pans will be filled and emptied once in each revolution of the cam shaft 14. When weighing up to maximum capacity, the filling occupies almost the entire period of the revolution, but when weighing only a small fraction of the capacity, the filling occupies but a small portion of each cam revolution, and the conveyer remains idle through a large portion. It will therefore be seen that if the tobacco is to be weighed in very small amounts, greater efficiency may be obtained in the machine by substituting cams having two throws, so that the scale will be operated twice for each revolution of the cam shaft. This is to considerable extent necessitated by the fact that the general speed of the machine cannot be increased beyond a certain point, without decrease of efficiency in its operation on the tobacco.

While the preferred form of machine has been shown and described, it will be understood that a number of modifications may be necessitated to adapt the machine to various kinds of tobacco, or tobacco which is handled in a special condition. It is held, however, that such modifications will be merely matters of mechanical skill in adapting the existing machine to new conditions by the substitute of equivalent parts or multiplication of existing parts, and are therefore included in this invention.

Having thus described my invention, what I claim is:—

1. In a tobacco weighing machine, a toothed conveyer belt, a revolving comb positioned to remove tobacco from said belt and a revolving washing roll adapted to remove juice and the like left by tobacco on the belt.

2. In a tobacco weighing machine, a toothed conveyer belt, a revoluble comb having the teeth thereon intermeshing with the conveyer teeth and adapted to remove tobacco from the belt, and a stationary comb positioned to remove tobacco from the revolving comb, a brush adapted to remove from the belt tobacco left by the comb, and a washing roll adapted to clean from the belt juice and the like left by the tobacco.

3. In a tobacco weighing machine, a tobacco conveying belt, pins thereon, a brush arranged to clean the belt and pins, and a washing roll engaging the pins of said belt.

In witness whereof, I have hereunto set my hand, in presence of two witnesses.

THOMAS R. STOCKARD.

Witnesses:
S. R. W. ALLEN,
C. W. TAYLOR.